(12) United States Patent
Knutsson et al.

(10) Patent No.: US 6,457,579 B1
(45) Date of Patent: Oct. 1, 2002

(54) CONVEYOR FOR WEDGE SHAPED PACKAGES

(75) Inventors: Alf Knutsson; Ingemar Olausson, both of Alingsås (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/674,699

(22) PCT Filed: May 3, 1999

(86) PCT No.: PCT/SE99/00731
§ 371 (c)(1),
(2), (4) Date: Dec. 22, 2000

(87) PCT Pub. No.: WO99/57047
PCT Pub. Date: May 3, 1999

(30) Foreign Application Priority Data

May 4, 1998 (SE) .............................. 9801550

(51) Int. Cl.[7] ..................... B65G 15/10; B65G 15/12; B65G 15/14; B65G 15/20
(52) U.S. Cl. .................... 198/817; 198/626.1
(58) Field of Search ................ 198/817, 606, 198/626.1

(56) References Cited

U.S. PATENT DOCUMENTS

| | | | |
|---|---|---|---|
| 3,498,443 A | * 3/1970 | Weber | 198/817 X |
| 3,823,815 A | * 7/1974 | Bretten et al. | 198/817 X |
| 4,709,799 A | 12/1987 | Ljungberg | |
| 4,832,179 A | * 5/1989 | Simmons | 198/817 X |
| 5,141,096 A | 8/1992 | Strasser et al. | |
| 5,373,685 A | * 12/1994 | Francioni et al. | 198/817 X |
| 5,839,569 A | * 11/1998 | Spindler et al. | 198/817 X |
| 5,915,525 A | * 6/1999 | Baker et al. | 198/817 X |
| 6,131,724 A | * 10/2000 | Hirasawatu et al. | 198/606 X |

FOREIGN PATENT DOCUMENTS

| | | |
|---|---|---|
| DE | 2123334 | 12/1971 |
| EP | 0 814 036 A2 | 12/1997 |

* cited by examiner

Primary Examiner—Christopher P. Ellis
Assistant Examiner—Gene O. Crawford
(74) Attorney, Agent, or Firm—Burns, Doane, Swecker & Mathis, L.L.P.

(57) ABSTRACT

A conveyor includes a driven, endless belt on which wedge shaped packages are conveyed in a recumbent state. A driven, endless belt is provided on each side of the conveyor belt, with the driven endless belts preferably having circular cross sections. The driven belts and the conveyor belt share the same prime mover. The conveyor belt has a width which approximately corresponds to the width A of the package at its bottom. The driven belts are disposed approximately 5-20 mm above the conveyor belts and are provided with a width B between the belts which is greater than the width A of the package bottom and less than the width C of the package at its top.

4 Claims, 3 Drawing Sheets

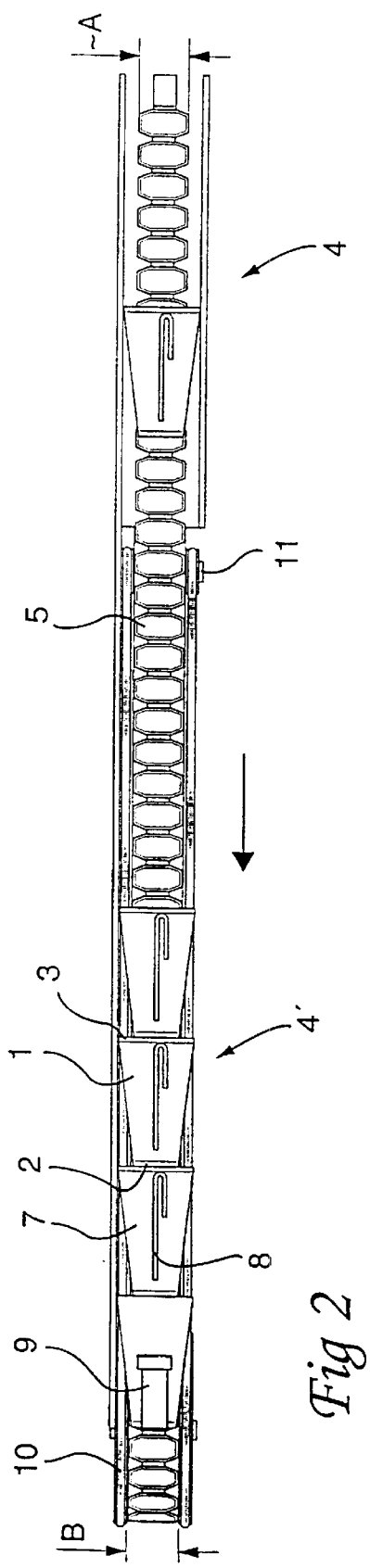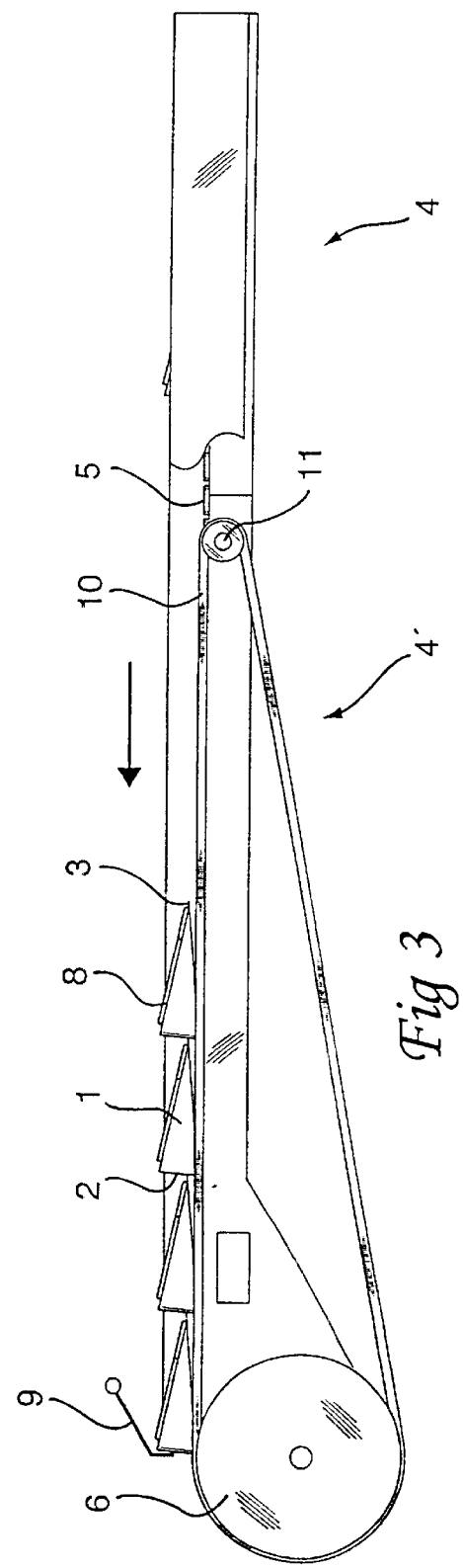

CONVEYOR FOR WEDGE SHAPED PACKAGES

TECHNICAL FIELD

The present invention relates to a conveyor for wedge shaped packages, comprising a driven, endless conveyor belt, which is disposed to convey the packages in the recumbent state.

BACKGROUND ART

In almost all manufacturing processes, use is made of conveyors for conveying finished products or semi-manufactures to different workstations or to packing in group multi-packs. Also in the production of packaging containers of the type which is employed for liquid or pumpable foods, use is made of conveyors for conveying the finished package from the filling machine to different machines for distribution equipment, such as applicators or tray packers.

The packages for liquid or pumpable foods may be of the type which is manufactured from a laminate with a core of paper or paperboard, to which are laminated different layers of thermoplastics and possibly aluminium foil (Alifoil). One type of these packages has a wedge shaped appearance. From a continuous material web of packaging material, the web is reformed into a tube which is longitudinally joint sealed and filled with the intended contents. Thereafter, the tube is sealed transversely and is cut into individual packaging blanks. By forming and folding in flaps, there will be obtained a planar bottom and by allowing the top of the package to remain unformed, a wedge shaped package will be obtained.

These wedge shaped packages are normally advanced in the recumbent state on the conveyor, since they are somewhat unstable in the upright position. From the filling machine, the ready-formed packages move down on a conveyor and become recumbent on it with the bottom first in the direction of movement of the conveyor. At the different workstations or distribution machines which the packages must pass, it is occasionally necessary to arrange a queue, for the packages to arrive at the correct moment. If a queue is formed for recumbent wedge shaped packages, the packages will inevitably "climb" on each other. and cause stoppage. In that case when the packages are provided with drinking straws, there is a risk that these are torn off from the packages

OBJECT OF THE INVENTION

One object of the present invention is, in a conveyor which conveys recumbent wedge shaped packages, to arrange a queue formation without the packages "climbing" on one another and causing stoppage or risking tearing off the drinking straw bags which are occasionally secured on the packages.

SOLUTION

This and other objects have been attained according to the present invention in that the conveyor of the type described by way of introduction has been given the characterizing feature that the conveyor belt has a width which approximately corresponds to the width A of the package at its bottom and a driven belt which is provided on either side of the conveyor belt and is disposed approx. 5–20 mm above the conveyor belt and with a width B between the belts which is greater than the width A of the package bottom but which is less than the width C of the package at its top.

Preferred embodiments of the present invention have further been given the characterizing features as set forth in the appended subclaims.

BRIEF DESCRIPTION OF THE ACCOMPANYING DRAWINGS

One preferred embodiment of the present invention will now be described in greater detail hereinbelow with particular reference to the accompanying Drawings, in which:

FIG. 2 shows, in plan view, a conveyor according to the present invention;

FIG. 3 shows, in side elevation, a conveyor according to the present invention;

The accompanying Drawings show only those parts and details essential to an understanding of the present invention, and the siting of the conveyor in connection with distribution machines, as will be well known to a person skilled in the art, has been omitted.

DESCRIPTION OF PREFERRED EMBODIMENT

Figure 1:
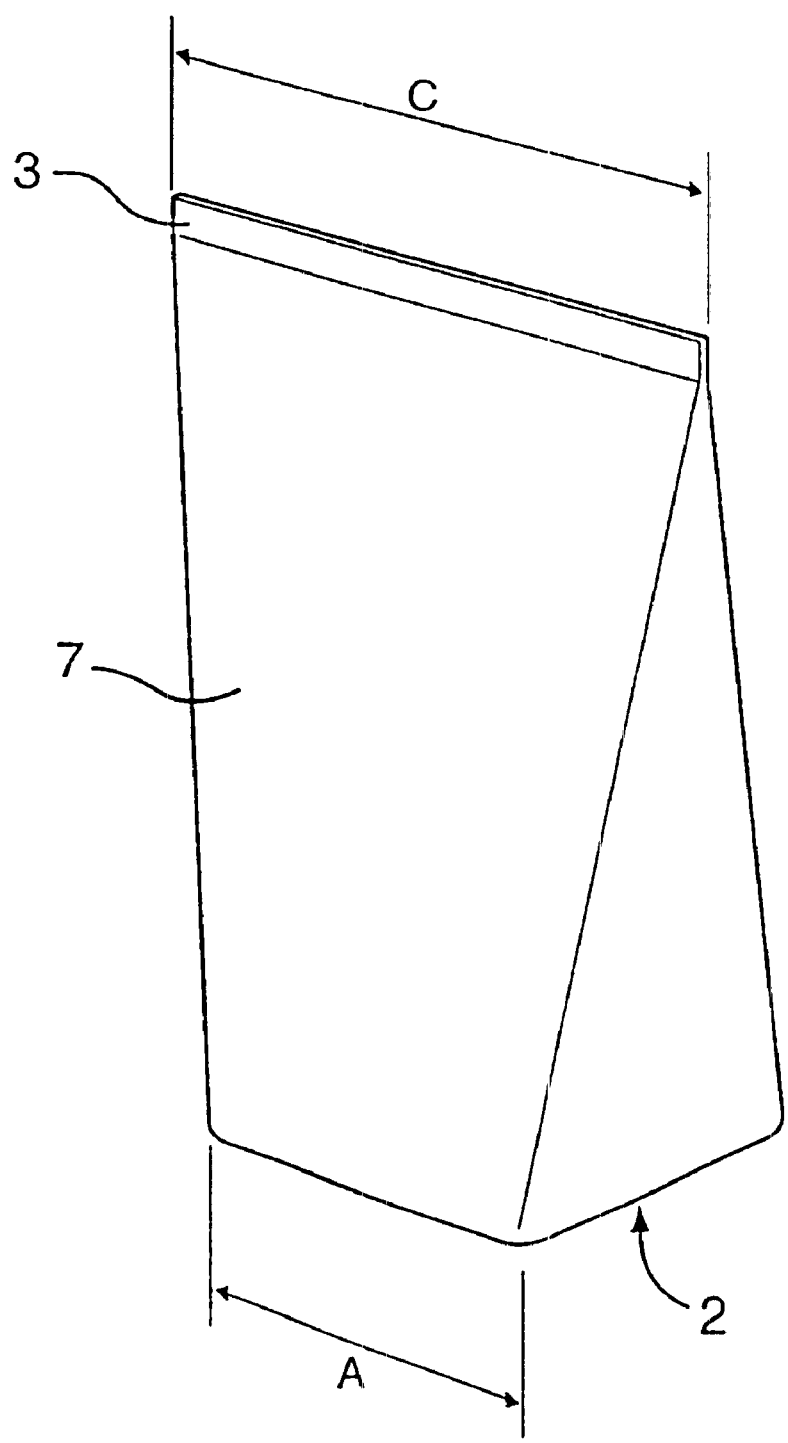
FIG. 1 shows a wedge shaped package.

Referring to the Drawings, FIG. 1 shows a wedge shaped package 1 of the type for which a conveyor 4 according to the present invention is intended. In a filling machine, the wedge shaped package 1 is manufactured from a continuous material web. The material web has a core layer of paper or paperboard to which are laminated different thermoplastic layers and possibly a layer of aluminium foil. The material web is reformed in the filling machine into a tube whose overlapping edges are sealed together to form a longitudinal joint seam. The material tube is filled with the intended contents, such as milk, juice or other beverages, and is thereafter sealed transversely across the tube, and the material tube is severed in the seals, such that individual packaging blanks are formed. Flaps are formed in the one end of the packaging blank which are folded in and sealed in position so that a planar bottom 2 is obtained. The other end of the packaging blank is retained in the unformed state, for the formation of the top 3 of the package 1. As a result of this procedure, a wedge shaped package 1 will be obtained.

After final forming in the filling machine, the wedge shaped package 1 departs from the filling machine and is released from it so that it assumes a recumbent position on a conveyor 4. Normally, the packages 1 are advanced on the conveyor 4 with the bottom 2 first in the direction of travel. Alternatively, the packages 1 may be advanced with the top 3 first in the direction of travel.

The conveyor 4 includes a driven, endless belt 5 which is driven over a driving roller 6 and at least one bending roller. In FIGS. 2–5, only a part of a conveyor 4 is shown, for which reason the bending roller for the conveyor belt 5 is not included in the illustration. In FIGS. 2–5, only a part of the conveyor 4' has been designed according to the present invention and the remainder consists of a conventional conveyor 4. The Drawings show a queue arranged just ahead of the machine (not shown) which is intended to pack the packages 1 into cartons or multipacks. This presupposes that the packages can be retained until the correct moment in order that the multipack or the like can be packed correctly. The packages 1 are here already provided with a drinking straw bag secured on one side surface 7, with a drinking straw 8. Similar queue formations may be necessary to arrange in a corresponding manner in other distribution machines, such as applicators and the like.

The queue formation is arranged simply by means of an arrest member 9 which, in the preferred embodiment, is lowered down towards the package 1 and holds the first package 1 at its bottom 2. Other types of arrest members which are moved in towards the packages 1 from the side or which are raised up from beneath are conceivable.

That portion of the conveyor 4' which is designed according to the present invention is provided, on both side of the conveyor belt 5, with driven, endless belts 10. The belts 10 are preferably of circular cross section and, in the preferred embodiment, they are driven by the same prime mover or drive roller 6 as drives the conveyor belt 5. The belts 10 are driven over at least one bending roller 11 each. By employing the same prime mover for both the conveyor belt 5 and the belts 10, the same speed will be obtained for the different parts and since only shorter distances of the conveyor 4' are designed according to the present invention, the same friction can be realised. Possibly, the belts 10 may need to be supported by support wheels (not shown).

The conveyor belt 5 has a width which approximately corresponds to the width A of the package 1 at its bottom 2. The belts are placed 5–20 mm above the conveyor belt and with a width B between the belts 10 which exceeds the width A at the bottom 2 of the package 1 and which is less than the width C at the top 3 of the package 1. In the preferred embodiment, the belts 10 are placed 5–10 mm above the conveyor belt 5 and with a width B between the belts 10 which is approximately (A+C)/2. The belts 10 are symmetrically placed in relation to the center line of the conveyor belt 5.

Figure 4:
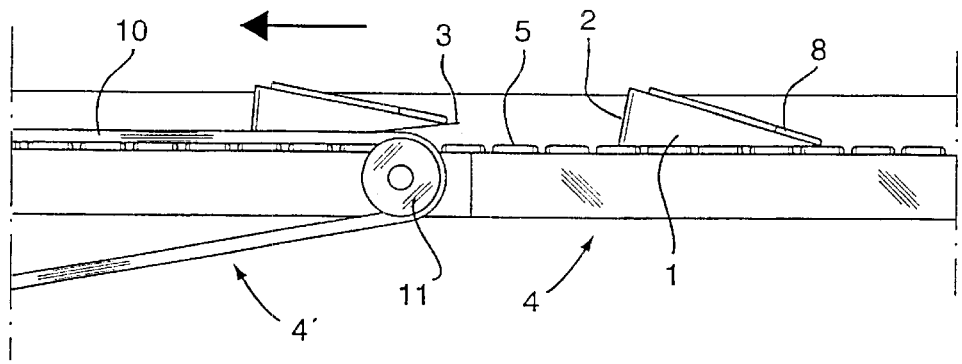
FIG. 4 shows, in side elevation, the transition between a conventional conveyor and a conveyor according to the present invention.
Figure 5:
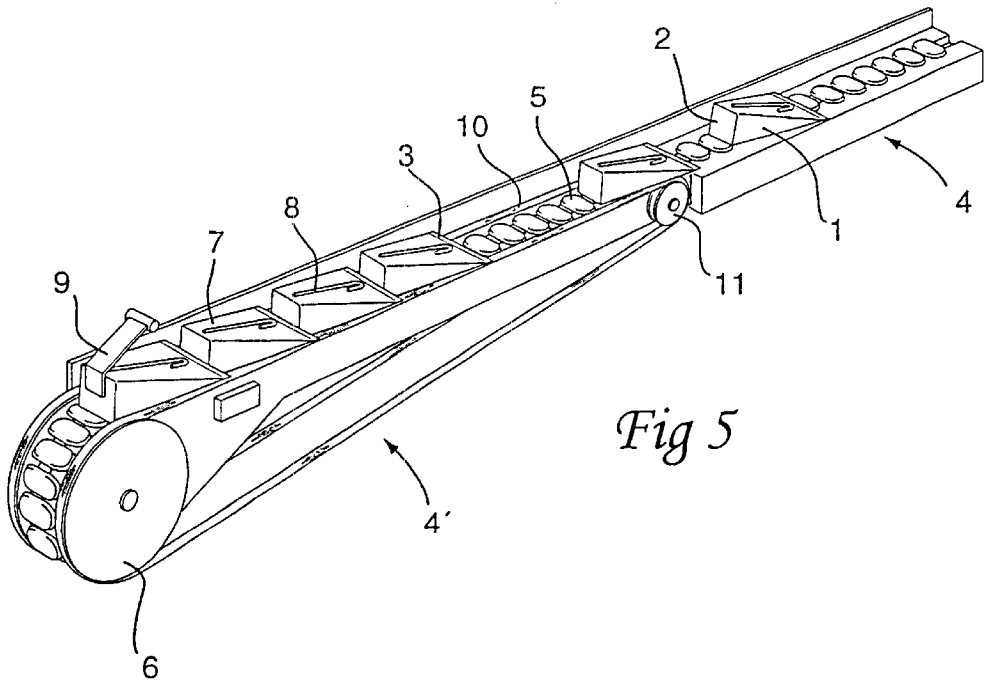
FIG. 5 is a overview of a conveyor according to the present invention.

FIG. 4 shows a package 1 recumbent on the conveyor 4 with the bottom 2 first in the direction of travel of the conveyor 4. The package 1 has already, in an earlier workstation, been provided with a drinking straw bag which is fixedly sealed to one side surface 7 and which contains a drinking straw 8. When the package 1 reaches that section of the conveyor 4' which is designed according to the present invention, the lower region of the package 1 will continued to rest on the conveyor belt 5. The upper portion of the package 1 is lifted up by the belts 10 and the package 1 rests on the belts 10 approximately in between its bottom 2 and its top 3. When a queue must be formed, as in before a carton packer, where a certain packing pattern must be complied with and the packages 1 must consequently arrive at the correct moment, an arrest member 9 is provided which may consist of a movable portion which, from a position above the conveyor 4', is moved down towards the packages 1 and holds the first package 1 in the queue, at its bottom 2. Since the upper portion of the packages 1 is held up from the conveyor belt 5 by means of the belts 10, the packages 1 will form an orderly queue without "climbing" on each other.

As will have been apparent from the foregoing description, the present invention realises a conveyor in which a queue formation may be arranged for recumbent, wedge shaped packages. The packages may be retained in the queue without beginning to "climb" on each other, which may cause stoppage and prevent the correct packing pattern from being obtained in, for example, a carton packer. If the packages are provided with drinking straws, the drinking straw may moreover be torn loose from the packages or be damaged.

The present invention should not be considered as restricted to that described above and shown on the Drawings, many modifications being conceivable without departing from the scope of the appended Claims.

What is claimed is:

1. A conveyor for wedge shaped packages, comprising:
    a driven, endless conveyor belt disposed to convey the packages in the recumbent state, wherein the conveyor belt has a width which approximately corresponds to the width A of the package at its bottom;
    a driven belt provided on each side of the conveyor belt, each of said driven belts being disposed approximately 5–20 mm above the conveyor belt and with a width B between the belts being greater than the width A of the package bottom and less than the width C of the package at its top.

2. The conveyor as claimed in claim 1, wherein the conveyor belt and the two driven belts share a common prime mover.

3. The conveyor as claimed in claim 1, wherein the width B between the driven belts is approximately (A+C)/2.

4. The conveyor as claimed in claim 1, wherein the driven belts are of circular cross section.

* * * * *